US007447709B1

(12) United States Patent
Rozenman et al.

(10) Patent No.: US 7,447,709 B1
(45) Date of Patent: Nov. 4, 2008

(54) METHODS AND APPARATUS FOR SYNCHRONIZING CONTENT

(75) Inventors: Vitaly Rozenman, Shrewsbury, MA (US); Rajesh K. Gandhi, Shrewsbury, MA (US); Benjamin Bushoy, Needham, MA (US); Venkata R. Tiruveedi, Franklin, MA (US); Richard T. Simon, Brighton, MA (US)

(73) Assignee: EMC Corporation, Hopkinton, MA (US)

( * ) Notice: Subject to any disclaimer, the term of this patent is extended or adjusted under 35 U.S.C. 154(b) by 453 days.

(21) Appl. No.: 11/169,464

(22) Filed: Jun. 29, 2005

(51) Int. Cl.
*G06F 12/00* (2006.01)

(52) U.S. Cl. .......................... 707/201; 707/8; 707/101; 707/200; 709/213; 711/141

(58) Field of Classification Search .................. 707/8, 707/101, 200, 201; 709/248, 213; 711/141
See application file for complete search history.

(56) References Cited

U.S. PATENT DOCUMENTS

| | | | | |
|---|---|---|---|---|
| 5,758,150 | A * | 5/1998 | Bell et al. ...................... | 707/10 |
| 6,026,408 | A * | 2/2000 | Srinivasan et al. ...... | 707/103 R |
| 6,636,250 | B1 * | 10/2003 | Gasser ........................ | 715/853 |
| 7,013,312 | B2 * | 3/2006 | Bala et al. ................... | 707/200 |
| 2003/0037020 | A1 * | 2/2003 | Novak et al. ................... | 707/1 |
| 2003/0131027 | A1 * | 7/2003 | Holenstein et al. .......... | 707/201 |
| 2003/0159136 | A1 * | 8/2003 | Huang et al. ................. | 717/171 |
| 2004/0024795 | A1 * | 2/2004 | Hind et al. ................... | 707/204 |
| 2005/0049945 | A1 * | 3/2005 | Bourbonnais et al. ......... | 705/30 |
| 2005/0108375 | A1 * | 5/2005 | Hallak-Stamler ........... | 709/223 |
| 2006/0031323 | A1 * | 2/2006 | Johnson ...................... | 709/206 |
| 2007/0016695 | A1 * | 1/2007 | Rabbers et al. ............. | 709/248 |

\* cited by examiner

*Primary Examiner*—Shahid Al Alam
*Assistant Examiner*—Phong Nguyen
(74) *Attorney, Agent, or Firm*—Chapin IP Law, LLC; Barry W. Chapin, Esq.

(57) ABSTRACT

A computer process initiates a pre-analysis of managed objects and corresponding structures for storing object data in a relational database. The pre-analysis yields a set of operational instructions (e.g., a "stored" database procedure) that can be applied at run time to more efficiently initiate a modification to objects and corresponding object data stored in a relational database. After execution of a stored procedure to modify contents of an object and respective contents in a relational database, a synchronizer utilizes an identifier to access a log that stores changes associated with a managed object to which the stored procedure was applied. Based on contents of the log, the synchronizer identifies changes to one or more managed objects and identifies corresponding processes that rely on use of the affected managed objects. The synchronizer then notifies corresponding processes utilizing the affected managed objects of the changes to the relational database and/or managed objects.

12 Claims, 7 Drawing Sheets

METHODS AND APPARATUS FOR SYNCHRONIZING CONTENT

RELATED APPLICATIONS

This application is related to U.S. patent application Ser. No. 11/169,458 entitled "METHODS AND APPARATUS FOR MANAGING CONTENTS OF A DATABASE," filed on an even date herewith, the entire teachings of which are incorporated herein by this reference.

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to an increased need for storage by integrating high capacity data storage systems, data communications devices (e.g., switches), and computer systems (e.g., host computers or servers) into networks called "storage networks" or "Storage Area Networks" (SANs.) In general, a storage area network is a collection of data storage systems that are networked together via a switching fabric to a number of host computer systems operating as servers. The host computers access data stored in the data storage systems on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One way of managing resources associated with the storage area network is to maintain so-called managed objects. In general, a managed object is a software entity that defines a corresponding hardware or software resource of the storage area network. The network administrator utilizes the managed objects to identify different resources associated with the storage area network.

A set of managed objects can form an object hierarchy. A "top level" object (e.g., an object at a highest tier) associated with the hierarchy represents a particular storage resource (e.g., storage system) in the storage area network. Objects in the hierarchy beneath the "top level" object represent hardware or software resources of the storage area network associated with the particular storage resource. Accordingly, a hierarchy of managed objects can define specific resources and corresponding sub-resources in the storage area network associated with a respective storage system.

A storage administrator typically configures the storage area network to include multiple storage systems by creating and maintaining multiple object hierarchies. As suggested above, each object hierarchy represents a unique storage system (e.g., portion of resources) associated with the storage area network. Certain resources can be shared among multiple storage systems. Thus, multiple object hierarchies associated with the storage area network can include the same managed object. Other resources of the storage area network can be exclusive to a particular one of the defined storage systems.

Typically, each managed object of the storage area network has associated object data. According to one conventional application, object data associated with respective managed objects is stored in a relational database. Upon instantiation, mapping metadata provides an indication how to populate managed objects with corresponding object data retrieved from the relational database.

SUMMARY

Conventional applications that support management of objects having respective object data stored in relational databases typically suffer from a number of deficiencies. For example, conventional object manager applications must provide functionality to issue many SQL (Structured Query Language) statements to a database server during run-time in order to update a relational database when a user initiates a command with respect to an object having corresponding data stored in the database. In addition to generating many (SQL) statements to modify the relational database at run-time, a conventional object manager application must keep track of changes to object data in the relational database and manage providing notifications to different processes when an object (or objects) has been modified so that such processes are kept current with respective changes to the object (or objects) and corresponding data in the relational database.

Techniques discussed herein deviate with respect to conventional applications such as those discussed above as well as other techniques known in the prior art. For example, embodiments herein provide for a pre-analysis (e.g., during a design phase) of an object manager and corresponding structures for storing object data in a relational database. The pre-analysis at the design phase yields a set of operational instructions (e.g., a "stored" procedure) that can be applied at run time (e.g., when users utilize the objects for management purposes) to more efficiently initiate a modification to objects (of a particular type) and corresponding content (e.g., object data) stored in a relational database. In one embodiment, the stored procedure is stored in a database server that is distinct from an object manager that manages cached object copies using the data stored in the database.

During run-time, an object manager overseeing a set of cached object copies receives a request (from a user or other entity) to modify a specified object and respective contents of the relational database storing information associated with the specified object (and related objects). In response to receiving the request, the object manager initiates execution of the stored procedure with respect to the specified object. In one embodiment, to carry out a request to modify the specified object, the object manager communicates with a database manager (e.g., a server associated with the relational database storing the stored procedure) that in turn initiates execution of the stored procedure to modify contents of the relational database for the specified object.

After execution of a stored procedure by the database manager to modify contents of an object and respective contents in a relational database, a synchronizer (e.g., a process associated with the object manager initiating execution of the stored procedure) utilizes an identifier to access a respective log storing changes associated with a managed object to which the stored procedure was applied. In one embodiment, the respective log is generated by a logger associated with the database manager applying the stored procedure with respect to contents of the relational database.

Application of the stored procedure to the managed object can affect the managed object itself (e.g., the managed object to which the stored procedure is applied) as well as other related managed objects also having respective object data stored in the relational database. Changes with respect to the related managed objects are also stored in the respective log. Consequently, the respective log can track changes associated with multiple objects having corresponding data stored in the relational database.

Based on contents of the respective log, the synchronizer identifies changes to one or more managed objects and identifies corresponding processes that rely on use of the affected managed objects. The synchronizer then notifies the corresponding processes of the changes to the relational database. The notified processes thus can refresh themselves with updated object data recently stored in the relational database (or updated cached object copies in memory) rather than rely on use of old outdated object data existing prior to executing the stored procedure. Accordingly, one process using the managed objects can initiate a modification with respect to a specified object while other process using the specified managed object or related managed objects are notified of such modifications.

One application of the above technique is an environment in which one of multiple users (e.g., processes) initiates deletion of a managed object corresponding to a resource in a respective storage area network. Consequently, in this type of application, the user can issue a command through an object manager. The object manager forwards the command to a database manager or server having access to a corresponding relational database. The database manager initiates execution of a stored procedure to carry out a respective modification command on behalf of the user. As mentioned, execution of the stored procedure prompts generation of a log that stores information identifying changes to the relational database and managed objects. A synchronizer of the object manager accesses contents of the log to identify managed objects affected as a result of executing the stored procedure. Thereafter, the synchronizer notifies affected processes of pertinent modifications to the relational database based on contents of the log so that the processes are kept current of changes to data in the relational database.

In addition to the embodiments discussed above, other embodiments herein include a computerized device (e.g., a host computer, workstation, computerized system of multiple computers, etc.) configured to support the aforementioned method/operations to facilitate notification of changes to an object (or object hierarchy) having corresponding data stored in a relational database. In such embodiments, the computerized device or application generating the set of operational instructions includes a memory system, a processor (e.g., a processing device), a display, and an interconnect. The interconnect supports communications among the display, the processor, and the memory system. The memory system is encoded with an algorithm that, when executed on the processor, produces a process that facilitates notification and synchronization as discussed herein.

Yet other embodiments disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to facilitate notification and synchronization as explained herein. The computer program logic, when executed on at least one processor in a respective computing system, causes the processor to perform the operations (e.g., the methods, algorithm, technique) indicated herein. Such embodiments are typically provided as software, code, and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular configuration herein is directed to a computer program product that includes a computer readable medium having instructions stored thereon for facilitating notification based on changes to a relational database. The instructions, when carried out by a processor of a respective computer device, cause the processor to perform the steps of: a) initiating execution of a pre-generated set of database instructions to modify contents of the relational database associated with the managed object, execution of the set of database instructions prompting generation of a log of corresponding changes to contents of the relational database associated with the managed object; b) storing an identifier associated with the log; and c) providing notification of the identifier to a synchronizer that utilizes the identifier to: i) access the log, ii) identify the corresponding changes, and iii) notify at least one process utilizing the managed object regarding the changes to the contents of the relational database associated with the managed object. Other embodiments of the present disclosure include software programs to perform any of the method embodiment steps and operations summarized above and disclosed in detail below.

As discussed, techniques herein are well suited for use in applications in which a synchronizer provides notification of changes with respect to a managed object having respective object data stored in a relational database. However, it should be noted that embodiments herein are not limited to use in such applications.

It should be understood that the system herein can be embodied as a software program or as a software program operating in conjunction with corresponding hardware. Example embodiments of the present application may be implemented in conjunction with EMC's Control Center software application that provides graphical management functionality for storage area network resources and in computerized devices that operate the Control Center software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one configuration herein, a computer process herein initiates a pre-analysis of managed objects as well as corresponding structures for storing object data in a relational database. The pre-analysis (performed at design time) yields a set of operational instructions (e.g., a "stored" procedure) that can be applied at run-time to more efficiently initiate a modification to objects (of a particular type) and corresponding contents (e.g., object data) stored in a relational database. In one embodiment, the set of operational instructions are stored in a database manager that manages contents of the relational database.

After execution of a stored procedure that modifies an object and respective contents of the object in a relational database, a synchronizer utilizes an identifier in a newly generated object (e.g., a result set object) to access a log that stores changes associated with a managed object to which the stored procedure was applied. Application of the stored procedure with respect to the managed object (e.g., any project having respective data stored in a relational database) can affect the managed object itself as well as other related managed objects also having respective object data stored in the relational database. Thus, the managed object itself (and related data) may be modified as well as related managed objects (and corresponding data) in the relational database in response to executing the stored procedure.

Based on contents of the log (which identifies changes to the database 180 resulting from execution of the set of operational instructions known as a stored procedure), the synchronizer identifies changes to one or more managed objects and identifies corresponding processes that rely on use of the managed objects affected by the changes. The synchronizer notifies the corresponding processes of the changes to the relational database. The notified processes thus can refresh themselves (e.g., their local representations of the objects) so that they now use object data recently updated in the relational database rather than rely on use of old outdated object data existing prior to executing the stored procedure. In other words, the notifications issued by a synchronizer ensure that the remote processes using the objects remain synchronized with respect to changes to managed objects and corresponding data in a relational database.

Figure 1:
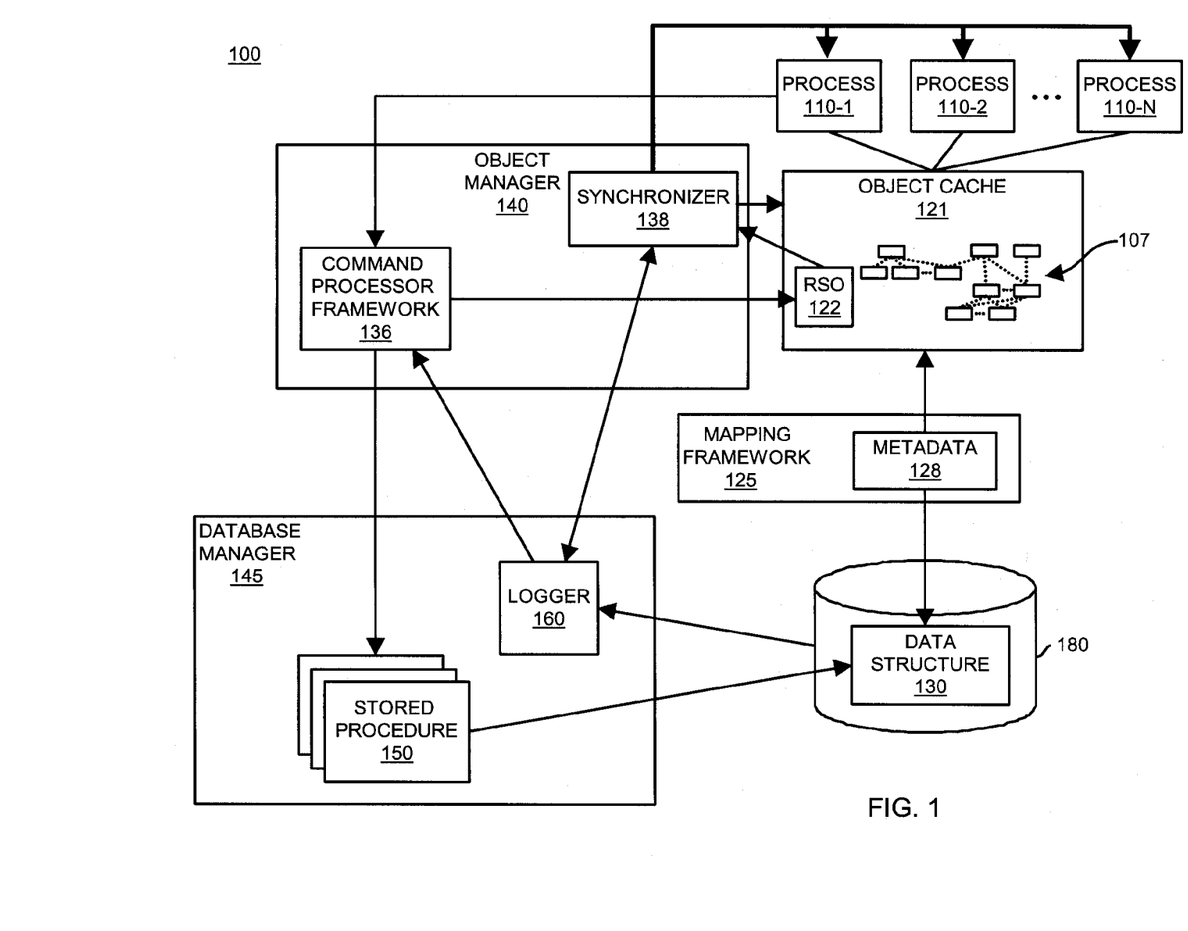
FIG. 1 is a diagram illustrating an environment for initiating execution of a stored procedure, detecting changes to a relational database, and notifying processes regarding the changes according to an embodiment herein.

FIG. 1 is a diagram illustrating an environment 100 in which one or more of processes 110 initiates execution of a stored procedure 150 to modify respective objects in object hierarchies 107 and corresponding object data in relational database 180. In response to learning of a modification to contents of relational database 180 and managed objects in object cache 121 (e.g., an object identity map), synchronizer 138 updates object hierarchies 107 and notifies certain processes 110 of changes with respect to the object hierarchies 107 and corresponding object data in relational database 180 according to an embodiment herein. Consequently, after notification, the processes 110 utilizing "changed" managed objects in object hierarchy 107 can communicate with object cache 121 and/or cause the object cache 121 to refresh information associated with respective objects used by the processes 110.

As shown, environment 100 includes multiple processes 110 (e.g., process 110-1, process 110-2, . . . , process 110-N), object cache 121 (e.g., object environment), mapping framework 125, relational database 180, object manager 140, and database manager 145 (e.g., a server). Database manager 145 includes logger 160 and stored procedure 150. Stored procedure 150 is one of multiple stored procedures (e.g., a set of operational instructions executed at database) that can be applied to different types of objects in object hierarchy 107 for modifying contents of database 180. Object manager 140 includes command processor framework 136 and synchronizer 138. Object cache 121 includes result set object 122 and object hierarchies 107 (e.g., one or more hierarchies). Mapping framework 125 includes metadata 128. Relational database 180 includes data structure 180 for storing information associated with the objects in object hierarchy 107.

In general, object cache 121 (e.g., memory) includes a representation or instantiation of one or more possible object hierarchies 107 (e.g., cached object copies) including respective managed objects accessible by processes 110 (such as clients) operating at respective remote locations with respect to the object cache 121. In the context of a storage area network, object cache 121 resides in a centralized management station (e.g., a computer managing resources in a storage area network environment as more particularly shown in FIG. 7) and includes hierarchies of resources associated with the storage area network. In this example, processes 110 access the objects in object cache 121 to learn of a configuration of a respective storage area network.

Objects in object hierarchy 107 are populated with object data stored in relational database 180. Because object cache 121 includes objects having respective object data stored in relational database 180, changes to object data or deletion of objects with respect to content of database 180 requires that object cache 121 be updated so as to be synchronous with database 180. Typically, processes 110 need to be informed when there are changes to objects having respective data stored in database 180 so that they remain current and synchronized with each other. In one embodiment, when a respective process 110 refreshes itself based on a notification from the object manager 140, this causes the object cache 121 (e.g., object identity map) to update itself so that the object cache 121 and object copies are synchronized with the contents of database 180.

Mapping framework 125 and, more specifically, metadata 128 maintains a mapping relationship between an object manager 140 and database 180 (e.g., a relational database) for populating managed objects in object hierarchy 107 with data stored in data structure 130 of database 180. Based on input from mapping framework 125 and database 180 during a design phase, a procedure generator performs a pre-analysis to generate stored procedure 150 such as a set of operational instructions to execute a command with respect to a selected managed object in object hierarchy 107 and corresponding information associated with one or more managed objects in database 180. In other words, stored procedure 150 is a pre-generated set of operational instructions to carry out a command (e.g., a delete object command) with respect to an object in object hierarchy 107 and corresponding contents in database 180. Thus, certain techniques herein involve anticipating the application of a command (e.g., a delete command, a modify command, etc.) to a managed object (or multiple managed objects) having associated contents such as object data stored in database 180. Additional details of generating one or more stored procedure 150 are discussed in related application entitled "METHODS AND APPARATUS FOR MANAGING CONTENTS OF A DATABASE," incorporated herein by reference as stated above.

In one embodiment, objects in object hierarchy 107 form one or more object hierarchies 107 of managed objects associated with a storage area network. As will be further discussed, contents of the object cache 121 such as the objects themselves and/or all or part of an object hierarchy can be modified based on input such as a command from a user initiating deletion of a "top level" or "root" managed object in the object cache 121. For example, one of multiple users (or other entities such as processes 110) can initiate deletion of a managed object (e.g., a storage system) in object cache 121. Depending on an association of the managed objects with respect to each other, one or more managed objects 105 typically will be modified or deleted in response to receiving, for example, a delete object command with respect to a given managed object.

When deleting an object existing in object cache 121 such as by initiating execution of stored procedure 150, contents of database 180 may need to be modified as well because database 180 and, more specifically, data structure 130 includes information associated with the managed objects 105 being deleted. In a similar vein, when modifying or deleting information associated with managed objects in relational database 180, object cache 121 needs to be updated so that object cache 121 and corresponding contents of database 180 are synchronized with respect to each other. Also, processes 110 utilize cached object copies in object cache 121. Consequently, the processes 110 must update their local representations (e.g., copies) of the managed objects as well as object cache 121 when a change occurs to contents of database 180. As mentioned, in one embodiment, processes 110 reside at one or more remote computers while object cache 121 resides in a centralized location such as a management control center associated with a storage area network.

As mentioned, object cache 121 (e.g., memory in the management control center) includes cached object copies in object hierarchy 107. Object manager 140 generates cached object copies in object hierarchy 107 of object cache 121 via use of mapping framework 125 and, more specifically, metadata 128. This "initialization" process occurs prior to receiving a command from a given process 110 to modify object hierarchy 107 and respective data in database 180.

As shown, the metadata 128 resides at a mapping layer between object cache 121 and the relational database 180. Use of the metadata 128 enables the object manager 140 to identify a relationship between the objects in object cache 121 and contents of database 180 so that object manager 140 can populate the objects with appropriate data stored in database 180.

Object manager 140 tracks which of the processes 110 use which of the corresponding objects in object cache 121 so that upon detection of a change to an object, the object manager 140 can notify affected respective processes 110 of any updates and/or changes with respect to the affected managed object.

As briefly discussed, processes 110 (e.g., clients) can issue commands and modify objects in object cache 121 and corresponding contents in database 180. When such an event occurs, command processor framework 136 of object manager 140 receives a request from a given process (such as process 110-1) having access to the set of managed objects (e.g., cached object copies) in object cache 121.

In this example, assume that process 110-1 issues a request to apply a command with respect to a managed object in object cache 121. The process 110-1 sends the request to command processor framework 136 of object manager 140. As mentioned, the request received by the command processor framework 136 indicates a command as well as a particular object to which the command is being applied. In one embodiment, the request is a command to execute the stored procedure 150 and modify the contents of the relational database associated with the specified managed object. Command processor framework 136 includes a map that identifies which stored procedure 150 to execute for each of different types of commands received from the processes 110.

After receiving the request in this example, command processor framework 136 generates a transaction identifier associated with the request to apply the command to the specified managed object. As its name suggests, the transaction identifier identifies the respective transaction associated with the request and execution of the stored procedure 150. As will be further discussed, the transaction identifier is used for bookkeeping purposes.

In response to receiving the request, command processor framework 136 (e.g., delete managed object framework) initiates execution of stored procedure 150 associated with the command to modify contents of the relational database 180 associated with the managed object to which the commands is applied. Command processor framework 136 applies the command by communicating with database manager 145 to initiate execution of the stored procedure with respect to contents of the relational database 180.

In one embodiment, stored procedure 150 can be applied to managed objects of a particular type such as a "top level" managed object associated with a type of storage system of a storage area network. As mentioned, a stored procedure 150 includes a set of operational database instructions having been generated based on an design time analysis associated with a particular object type and corresponding structure for storing data in the relational database prior to receiving the request. Thus, the stored procedure 150 can be generated in a design phase based on a corresponding type of structure for storing information in the relational database for that type while the stored procedure can be executed at run-time when processes 110 actually use the objects in object hierarchy 107 and issue commands with respect to such objects.

In response to communicating a respective command to database manager 145 (e.g., a server associated with database 180) to execute stored procedure 150, database manager 145 initiates execution of the set of operational instructions associated with the stored procedure 150 to modify contents of database 180 for the respective managed object as specified by process 110-1 during run-time. Via use of the transaction identifier associated with the request, the object manager 140 and database manager 145 can keep track of and identify a status of executing the stored procedure 150. For example, the command processor framework 136 can communicate with database manager 145 and retrieve a status associated with the transaction identifier and corresponding request. Thus, command processor framework 136 at least on occasion can receive an indication regarding a status of executing the stored procedure 150 with respect to the contents of the relational database 180.

As will be further discussed later in this specification, changes associated with execution of the stored procedure 150 may not be committed to database 180 until other miscellaneous operations are performed to complete carrying out the request.

Upon execution of stored procedure 150, contents of database 180 in data structure 130 can be modified immediately as result of executing the stored procedure or at a later point in time. In one embodiment, the changes to database 180 for an executed stored procedure 150 remain pending until such changes are committed to database 180.

Logger 160 of database manager 145 maintains information such as records (e.g., a Delete Change Set table) indicating pending changes (or actual changes) to (rows and tables of information in) database 180 associated with the executed stored procedure 150. For example, logger 160 stores the transaction identifier associated with the request as well as corresponding changes to rows or entries of tables in the database 180 effectuating a deletion or update of a managed object in the object hierarchy 107. As will be further discussed later in this specification, the information (e.g., records associated with the transaction identifier) in logger 160 are used by the synchronizer 138 to identify which of one or more objects in object hierarchy 107 are affected by execution of the stored procedure 150. The information in logger 160 identifies changes to the object hierarchy 107 and or database 180 as a result of applying the command.

After generating and storing changes to database 180 in a respective log of logger 160, database manager 145 provides command processor framework 136 with a handle (e.g., an identifier or pointer to the respective log) associated with logger 160. The handle points to all records or changes associated with the execution of the stored procedure 150 as captured in the respective log of logger 160. In one embodiment, the logger 160 stores the transaction identifier associated with the request along with the records identifying respective changes to database 180. Thus, the object manager 140 can identify which portions of the log pertain to which transactions.

Command processor framework 136 receives the handle (e.g., identifier) for accessing a respective log generated by logger 160. As discussed, the log indicates a set of changes to the contents of the relational database as a result of executing the stored procedure 150 with respect to contents in the relational database 180 associated with the managed object to which the command was applied. The changes identified by the respective log also can identify changes to managed objects related to the managed object to which the command was applied. The latter type of changes can occur when application of the stored procedure 150 results in changes to managed objects residing at a lower level of an object hierarchy with respect to the managed object to which the command was applied. Thus, a user can initiate execution of stored procedure 150 with respect to a top-level managed object in a hierarchy resulting in modification of the top-level managed object in the hierarchy as well as other objects beneath the top-level managed object and corresponding data in the relational database.

In response to receiving the handle from logger 160, command processor framework 136 creates a result set object 122 in object cache 121. The command processor framework 136 instantiates the result set object 122 to include the transaction identifier associated with the request and corresponding pointer or handle to a respective log of logger 160 storing information associated with modifications to the contents of the relational database for the specified managed object.

In one embodiment, the result set object 122 includes a table. The table includes the transaction identifier and corresponding handle for records in the respective log of logger 160 identifying pending changes to contents in database 180. One purpose of the result set object 122 therefore is to maintain the handle and/or transaction identifier for retrieving information from the logger 160 indicating a location in the log of tracking changes to the contents of the relational database as a result of applying the stored procedure 150. The command processor framework 136 eventually notifies synchronizer 138 of an identifier associated with the result set object 122 so that the synchronizer 138 can (at a point later in this process) access the information in result set object 122 to identify records maintained by logger 160 regarding changes to the database 180.

In one embodiment, the result set object 122 can include different types of handles such as Deleted Object ID and Updated Object ID. The first type of handle (e.g., Deleted Object ID) identifies entries in the respective log associated with objects that have been deleted altogether, whereas the second type of handle (e.g., Updated Object ID) identifies objects whose contents have merely been modified and not deleted.

Upon completion of executing the stored procedure 150 and initiating any other required modifications to database 180 and objects in object cache 121 for the request, object manager 140 commits the pending changes to the database 180. Upon confirmation that the set of pending changes as identified in the respective log of logger 160 have been committed for purposes of changing contents of the relational database 180, the command processor framework 136 provides a notification of completion to synchronizer 138. The notification of completion indicates that the changes have been "committed" to the database 180.

The synchronizer 138 then utilizes the identifier (or identifiers) in the result set object 122 to access the respective log in the logger 160 to determine the set of changes in the relational database 180 with respect to the managed object to which the command was applied as well as other affected managed objects. That is, the synchronizer 138 calculates and retrieves a "change set" associated with executing the stored procedure 150.

As mentioned, execution of a stored procedure 150 at run-time with respect to a single specified managed object can result in modifications to multiple managed objects in the object hierarchy 107 and corresponding contents in database

180. For example, process 110-1 may issue a command with respect to a single top-level managed object in object hierarchy 107. In such a case, execution of stored procedure 150 associated with the command results in deletion of the specified top-level managed object (e.g., a storage system) as well as potentially "child" managed objects (e.g., storage devices) associated with the specified top level managed object. Certain "child" managed objects associated cannot be deleted but may be modified if such child managed objects are used by other top level managed objects in object hierarchy 107. Thus, the respective log in logger 160 includes records of changes to the managed object specified (e.g., the top level managed object) in the request as well as other managed objects (e.g., child managed objects) present in the object cache 121. In any case, changes to contents of the database 180 for an object raises the need to update object cache 121 by deleting certain managed objects and potentially updating other managed objects with the appropriate object data stored in relational database 180.

Based on receiving notification from command processor framework 136 that changes have been committed to database 180 for the request issued by process 110-1 in the above example, the synchronizer 138 modifies the set of managed objects in object cache 121 according to the recorded changes in the relational database 180 via use of the result set object 122 and changes identified in the respective log generated by logger 160. Thus, in one embodiment, synchronizer 138 utilizes the handle (or handles as the case may be) in result set object 122 to access records in logger 160 to identify changes to database 180 occurring with respect to a specified object. Based on records in the respective log in logger 160, synchronizer 138 initiates updates to object cache 121 depending on the changes as identified by logger 160. For example, synchronizer 138 deletes a respective managed object in object hierarchy 107 of object cache 121 if the records in the respective log indicate that entries for storing object data in the database 180 associated with a given object have been deleted. Additionally, synchronizer 138 updates the objects in the object hierarchy 107 if content (e.g., object data) in database 180 has changed for objects not being deleted.

Synchronizer 138 also notifies respective processes 110 when there have been deletions or updates with respect to managed objects in object cache 121 and database 180. For example, object manager 140 keeps track of which processes 110 use which objects or object hierarchies in object cache 121. The synchronizer 138 utilizes the records in logger 160 to identify which objects are affected by executing the stored procedure 150. Accordingly, based on both of these sets of information, the synchronizer 138 can notify respective processes 110 utilizing affected managed objects regarding the set of changes (e.g., deletion, updates, etc.) to the relational database 180 and object cache 121 with respect to the managed object to which the command is applied and/or other affected managed objects associated with the managed object to which the command was applied.

In one embodiment, there are different types of subscribers (e.g., processes 110) that receive notifications from synchronizer 138. A first type of subscriber receives notifications when there has been a deletion of a managed object used by the respective process 110. In this case, there is no need to initiate a refresh by the process when the object is deleted.

A second type of subscriber receives notifications when there has been a change to a managed object used by the respective process 110. For this latter case, such a subscriber is notified of a name of attributes that changed or a relationship that changed for an existing object. This type of process can be "refreshed" with changes by receiving object identifiers and corresponding lists of attributes associated with the objects that have changed. The synchronizer 138 provides this information.

In the above example, recall that process 110-1 issues a command with respect to a specified managed object in object cache 121. Assume further in this example that process 110-2 utilizes (e.g., uses a locally stored representation of) the specified managed object to which the stored procedure 150 was applied. In such a case, the synchronizer 138 notifies process 110-2 of the change to the specified managed object as well as any other managed objects affected by executing the stored procedure 150 that are used by process 110-2. Consequently, the synchronizer 138 can target specific processes 110 to notify rather than provide a mere broadcast to all processes that a change occurred with respect to object in the object cache 121. In one embodiment, use of the broadcast technique is a viable way of notifying processes that object cache has been updated based on executing a stored procedure 150.

Upon notification of the changes to the specified managed object and potentially other managed objects, process 110-2 can then "pull" information or refresh its local representation of objects based on recently updated objects in object cache 121. In one embodiment, the synchronizer 138 "pushes" the appropriate information out to the processes 110 for refresh purposes.

Figure 2:
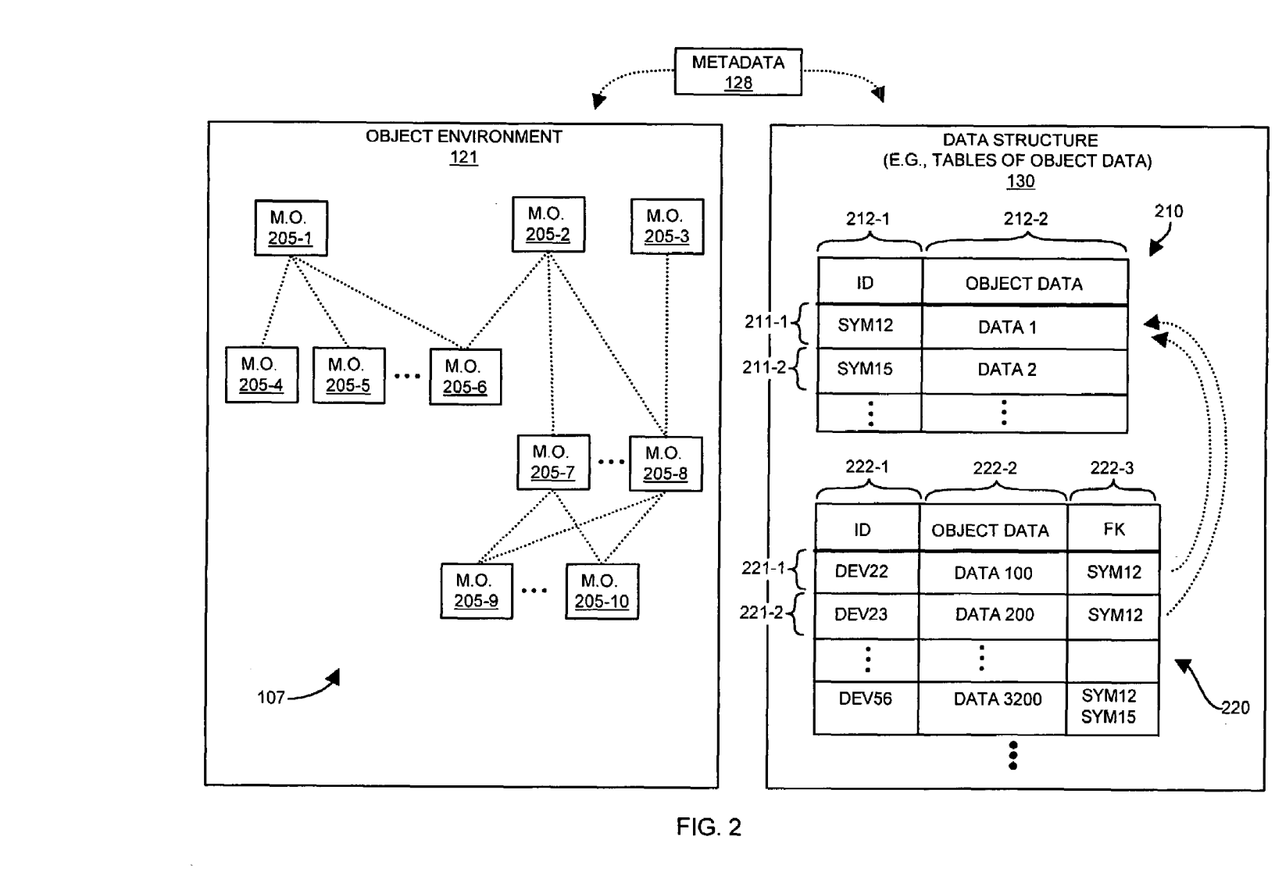
FIG. 2 is a diagram illustrating an object cache and a corresponding data structure of a database for storing information associated with managed objects according to an embodiment herein.

FIG. 2 is a block diagram more particularly illustrating how data structure 130 of database 180 stores information associated with managed objects 205 in object cache 121 (e.g., an object-oriented environment). As shown, object cache 121 includes different types of managed object hierarchies for maintaining information associated with resources in a storage area network. Note that an actual instantiation of object hierarchies (e.g., what managed objects exist in an object hierarchy) can vary depending on how a storage area network is actually configured during operation of the storage area network.

An object hierarchy in object cache 121 can include different types of relationships characterized based on use of different references (e.g., pointers) with respect to each other. For example, managed objects 205 in object cache 121 can be associated with each other via one-to-one relationships, one-to-multiple relationships, and multiple-to-multiple relationships. As will be discussed later in this specification, data structure 130 in database 180 includes similar references for purposes of storing respective object data.

One-to-one relationships correspond to relationships in which a "child" managed object belongs to only one corresponding parent managed object in a respective hierarchy. An example of a one-to-one relationship is managed object 205-7 because managed object 205-7 belongs solely to managed object 205-2 and no other managed objects at a next higher level.

One-to-multiple relationships correspond to relationships in which a "child" managed object belongs to multiple corresponding "parent" managed objects. An example of a one-to-multiple relationship is managed object 205-8 because managed object 205-8 belongs to both managed object 205-2 and managed object 205-3.

Multiple-to-multiple relationships correspond to relationships in which a group of "child" managed objects belongs to multiple different corresponding "parent" managed objects. An example of a multiple-to-multiple relationship is set of managed objects including managed object 205-9 and managed object 205-10. This set of managed objects belongs to both managed object 205-7 and managed object 205-8.

Note again that data structure 130 of relational database 180 stores information associated with managed objects 205 using the same types of relationships as discussed for objects in hierarchy 107 of object cache 121. In other words, the object hierarchy 107 can be defined based on one-to-one, one-to-many, and many-to-many types of relationships.

One purpose of identifying or learning the different types of relationships associated with managed objects in a respective managed object hierarchy is to be able to properly modify contents of database 180 after initiation of a delete command (e.g., stored procedure 150) with respect to an object in a respective hierarchy. For example, certain entries (e.g., object data, pointers, etc.) in data structure 130 must be preserved so that data structure 130 continues to maintain integrity associated with those managed objects not being deleted, while other entries in database 180 must be deleted for the managed object being deleted. Thus, portions of the object hierarchy 107 not affected by a delete command will be preserved while those affected by the delete command will be removed after applying the delete object command.

As an example, assume that a user (e.g., a process 110) were to initiate deletion of managed object 205-1. In this case, object data as well as references to object data associated with managed object 205-1, managed object 205-4 and managed object 205-5 will be deleted, etc. Additionally, a relationship reference (e.g., one or more pointers) between managed object 205-6 and managed object 205-1 will be deleted. However, object data for managed object 205-6 as well as a relationship reference between managed object 205-2 and managed object 205-6 must be preserved so as to maintain the integrity of managed object 205-2 and corresponding information in database 180 not being deleted. In other words, managed object 205-6 must not be deleted because managed object 205-6 is a "child" associated with managed object 205-2.

When modifying an object having an associated many-to-many type of relationship, procedure generator 140 generates stored procedure 150 such that relational database 180 continues to maintain integrity associated with portions of the content that must continued to be maintained because such contents are associated with other objects not being deleted. In other words, stored procedure 150 when initiated modifies entries in tables of relational database 180 for one-to-many relationships and many-to-many relationships so that relational database 180 no longer maintains references to information for the object being deleted but continues to maintain the information for other objects not being deleted.

As discussed, deletion of a managed object 205 from object cache 121 will have an affect on information stored in data structure 130 of database 180 for the corresponding object hierarchy. For example, contents of relational database 180 must be modified upon deletion of a corresponding managed object 205 so that database 180 does not needlessly store information associated with deleted managed objects.

Referring now more specifically to data structure 130 in FIG. 2, table 210 and table 220 of data structure 130 are examples of how relational database 180 stores information associated with managed objects 205. This example will help illustrate what contents of data structure 130 are impacted as a result of deleting a corresponding object in object cache 121. Entry 211-1 (e.g., first row) and entry 211-2 (e.g., second row) of table 210 store object data associated with respective top level managed objects 205-1, 205-2, etc. In this example, unique ID SYM12 of table 210 corresponds to managed object 205-1, unique ID SYM15 of table 210 corresponds to managed object 205-2, etc.

Also, entry 221-1 and entry 221-2 of table 220 correspond to respective managed object 205-4 and managed object 205-5. Unique ID DEV22 of table 220 corresponds to managed object 205-4, unique ID DEV23 of table 220 corresponds to managed object 205-5, unique ID DEV56 of table 220 corresponds to managed object 205-6, etc.

Metadata 128 includes mapping information to indicate that entry 211-1 corresponds to managed object 205-1, entry 211-2 corresponds to managed object 205-2, entry 221-1 corresponds to managed object 205-4, entry 221-2 corresponds to managed object 205-5, entry 221-N corresponds to managed object 205-6, etc.

More specifically, metadata 128 identifies that managed object 205-1 has associated object data in entry 211-1 of table 210, managed object 205-4 has associated object data in entry 212-1 of table 220, managed object 205-5 has associated object data in entry 221-1 of table 220, and so on. Metadata 128 also includes mapping information indicating that unique ID (e.g., SYM12) in column 212-1 of table 210 is associated with managed object 205-1 and that unique ID (e.g., SYM15) in column 212-1 of table 210 is associated with managed object 205-2. In one embodiment, the unique identifiers in column 212-1 of table 210 are known as primary keys.

Metadata 128 also indicates the corresponding unique IDs (e.g., DEV22, DEV23, and DEV56) in column 222-1 associated with respective managed object 205-4, managed object 205-5, managed object 205-6, and so on. Consequently, a respective table in data structure 130 can store information associated with a respective set of managed objects at a certain level of a managed object hierarchy 107. In the present example, each entry in table 210 includes information associated with respective "top level" managed objects (e.g., managed objects 205-1, 205-2, and 205-3). Each entry in table 220 includes information associated with managed objects at a tier just below the top level managed objects.

Note that table 220 includes column 222-3 to store reference information or pointers known as foreign keys. A respective foreign key in one table points to an entry in another table. In the present example, the entry 221-1 in table 220 for DEV22 includes a foreign key pointing to SYM12. The entry 221-2 in table 220 for DEV23 includes a foreign key pointing to SYM12. The entry 221-N in table 220 for DEV56 includes a foreign key pointing to SYM12 and SYM15. Thus, based on use of foreign keys, data structure 130 mirrors the relationships between managed objects 205 in object cache 121. In one embodiment, metadata 128 includes the foreign keys as well so that procedure generator 140 can identify a hierarchy and corresponding entries of different tables in data structure 130 pertaining to a respective managed object.

Although the above example discusses how tables 210 and 220 store information associated with object hierarchies in object cache 121, database 180 can include additional tables, sub-tables, etc. that function in a similar way to support storage of information associated with other portions or sub-portions of object hierarchies as well. Thus, database 180 includes additional information for other managed objects in object cache 121 including managed object 205-7, managed object 205-8, managed object 205-9, and so on.

One application of the technique discussed above is an environment in which a user initiates deletion of one or more managed objects 105 corresponding to a resource in a respective storage area network at run time after the stored procedure 150 is generated during a design phase. Consequently, in this type of application, the user can more effectively execute an object modification command. For example, a user can send a request (to initiate a delete command) to a server (e.g., database manager 145) associated with the relational database 180 to execute a command. Upon receipt of the command, the server (e.g., associated with a database 180) then initiates execution of the set of operational instructions (e.g., a stored procedure 150) to carry out the command on behalf of the user. Initiation of the stored procedure 150 results in generation of database commands such as SQL statements to carry out the requested function with respect to the contents of database 180. As mentioned, the object manager 140 utilizes a pointer to access a log generated by logger 160 to identify changes with respect to objects in the relational database 180. The object manager 140 then notifies appropriate processes 110 of objects that have been changed.

Figure 3:
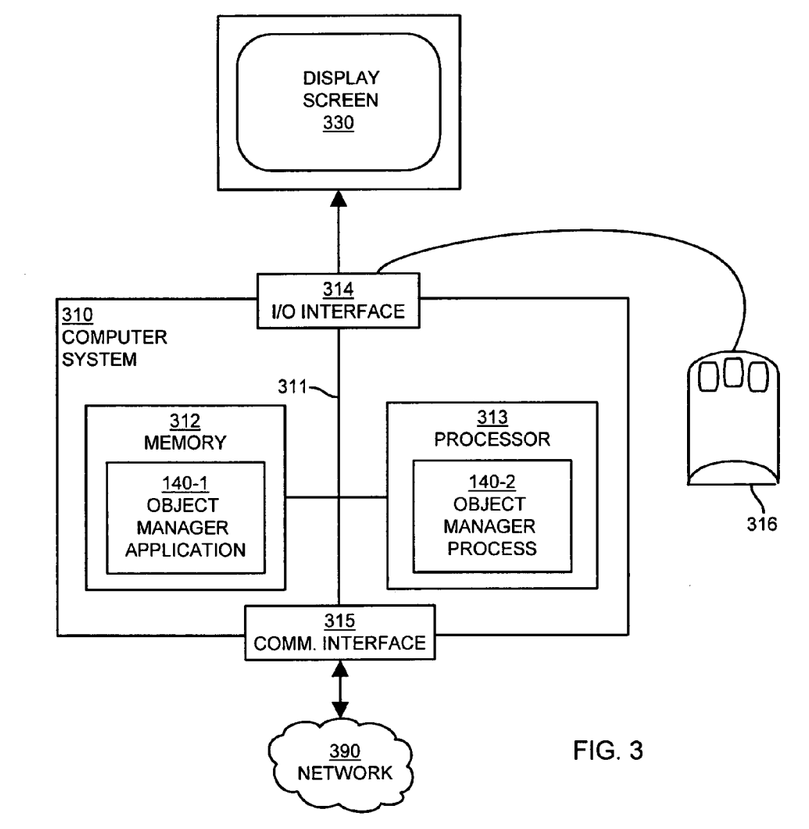
FIG. 3 is a block diagram of a processing device suitable for managing objects and providing notification of changes according to an embodiment herein.

FIG. 3 is a block diagram illustrating an example computer system 310 (e.g., a management control center) for executing an object manager application 140 according to embodiments herein. Computer system 310 may be a computerized device such as a personal computer, workstation, portable computing device, console, network terminal, processing device, etc.

As shown, computer system 310 of the present example includes an interconnect 311 that couples a memory system 312, a processor 313, I/O interface 314, and a communications interface 315. Peripheral devices 316 (e.g., one or more optional user controlled devices such as a keyboard, mouse, display screens, etc.) couple to processor 313 through I/O interface 314. Communications interface 315 of computer system 310 enables computer system 310 to communicate over network 390 to transmit and receive information from different resources.

As shown, memory system 312 is encoded with object manager application 140-1 supporting identification and notification of changes with respect to managed objects associated with a storage area network environment. Object manager application 140-1 may be embodied as software code such as data and/or logic instructions (e.g., code stored in the memory or on another computer readable medium such as a disk) that support functionality according to different embodiments described herein.

During operation, processor 313 accesses memory system 312 via the interconnect 311 in order to launch, run, execute, interpret or otherwise perform the logic instructions of the procedure generator application 140-1. Execution of object manager application 140-1 produces processing functionality in object manager process 140-2. In other words, the object manager process 140-2 represents one or more portions of the object manager application 140-1 (or the entire application) performing within or upon the processor 313 in the computer system 310.

It should be noted that object manager 140 (in FIG. 1) executed in computer system 310 can be represented by either one or both of the object manager application 140-1 and/or the object manager process 140-2. For purposes of this discussion and different embodiments of the invention, general reference will again be made to the object manager 140 as performing or supporting the various steps and functional operations as previously discussed and as will be discussed further in this specification.

It should be noted that, in addition to the object manager process 140-2, embodiments herein include the object manager application 140-1 itself (i.e., the un-executed or non-performing logic instructions and/or data). The object manager application 140-1 may be stored on a computer readable medium such as a floppy disk, hard disk or in an optical medium. The object manager application 140-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of object manager application 140-1 in processor 313 as the object manager process 140-2. Thus, those skilled in the art will understand that the computer system 310 may include other processes and/or software and hardware components, such as an operating system that controls allocation and use of hardware resources.

Functionality supported by computer system 310 and, more particularly, object manager 140 will now be discussed via flowcharts in FIGS. 4-6. For purposes of this discussion, computer system 310 and, more particularly, object manager 140 performs steps in the flowcharts at run-time. This functionality can be extended to the other entities as well. Note that there will be some overlap with respect to concepts discussed above for FIGS. 1 and 2. Also, note that the steps in the below flowcharts need not always be executed in the order shown.

Figure 4:
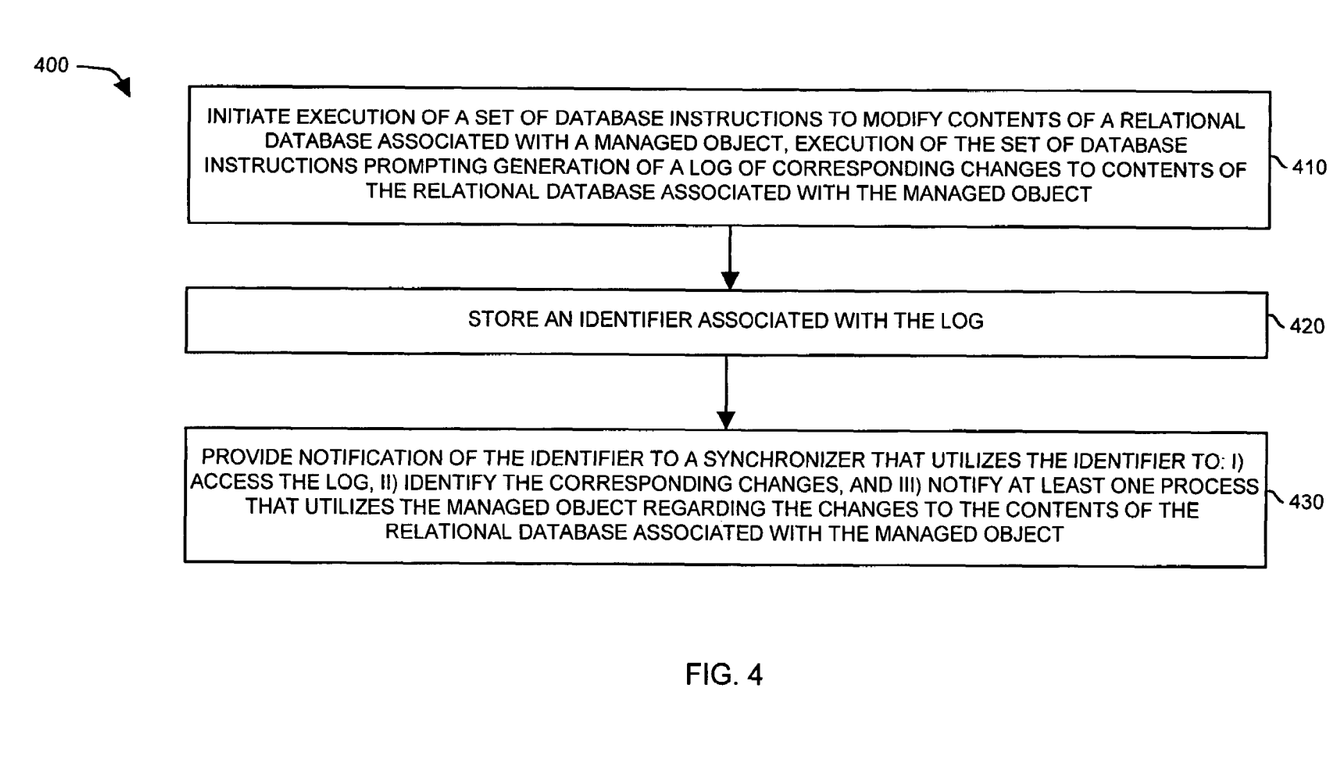
FIG. 4 is a flowchart illustrating a technique facilitating notification of changes to one or more managed objects according to an embodiment herein.

Now, more particularly, FIG. 4 is a flowchart 400 illustrating a technique of identifying changes to managed objects and providing notification to processes 110 as discussed above.

In step 410, object manager 140 initiates execution of a stored procedure 150 (e.g., set of database instructions) to modify contents of a relational database 180 associated with a specified managed object. As mentioned, stored procedure 150 is generated during a design phase prior to run-time. Execution of the stored procedure 150 at run-time via database manager 145 prompts the generation of a respective log by logger 160 to track corresponding changes to contents of the relational database 180 associated with the specified managed object being modified as well as related managed objects being modified.

In step 420, object manager 140 stores an identifier associated with the respective log in a location such as result set object 122.

In step 430, object manager 140 provides notification of the identifier in result set object 122 to a synchronizer 138 that utilizes the identifier to: i) access the log, ii) identify the corresponding changes to database 180 associated with the command, and iii) notify at least one process 110 that utilizes the specified managed object regarding the changes to the contents of the relational database 180 associated with the managed object.

Figure 5:
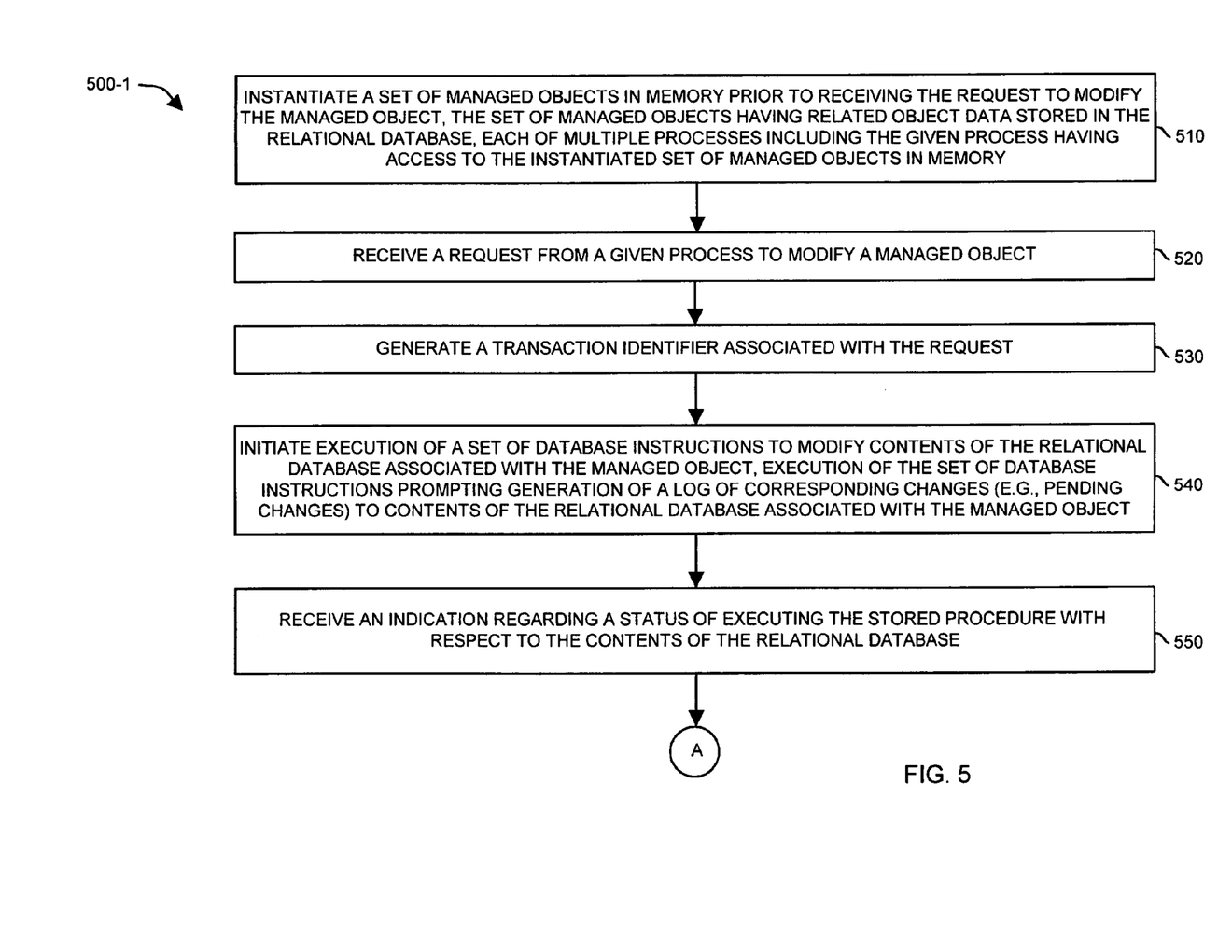
FIGS. 5 and 6 combine to form a more detailed flowchart illustrating a technique facilitating notification of changes to one or more managed objects according to an embodiment herein.
Figure 6:
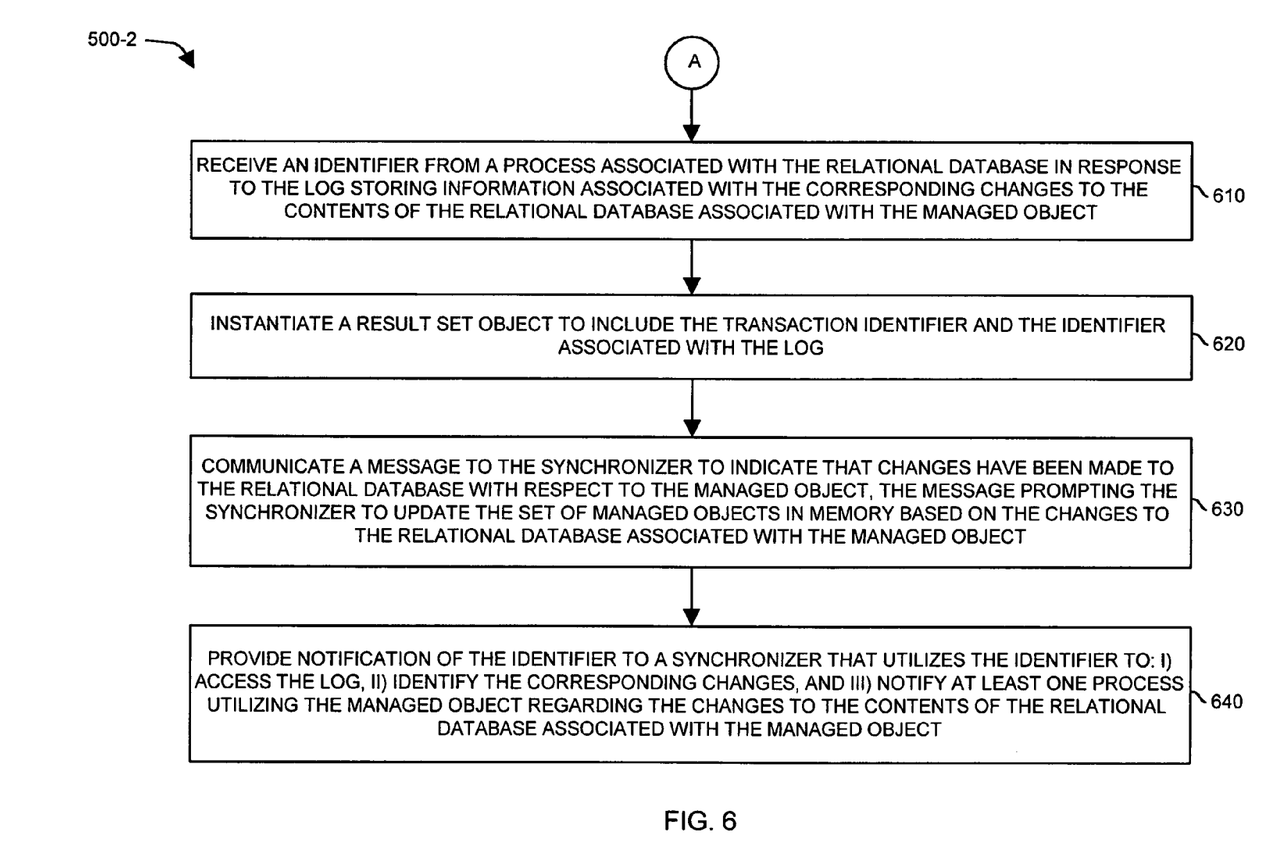

FIGS. 5 and 6 combine to form a flowchart 500 (including flowchart 500-1 and flowchart 500-2) illustrating a technique of identifying changes to managed objects and providing notification to processes 110 regarding deletions/changes to managed objects in object cache 121. Certain portions of the flowchart 500 such as generating the object manager 140 can be executed via computer system 310 (as in FIG. 3) while other portions such as executing a stored procedure 150 can be executed via database manager 145 associated with database 180.

In step 510 of flowchart 500-1, object manager 140 generates cached object copies (e.g., a set of managed objects in memory or object cache 121) prior to receiving a request to modify a managed object instantiated in memory (e.g., object cache 121). The set of managed objects instantiated in memory have related object data stored in the relational database 180. Each of the multiple processes 110 or at least one of processes 110 has access to the instantiated set of managed objects (e.g., cached object copies) in memory but does not necessarily use all cached object copies.

In step 520, the object manager 140 receives a request from a given process 110 to modify a managed object in the object cache 121.

In step 530, the object manager 140 generates a transaction identifier associated with the request.

In step 540, the object manager 140 initiates execution of a stored procedure 150 (e.g., pre-generated set of database instructions based on a data structure for storing data in the database) to modify contents of the relational database 180 associated with the managed object. Execution of the set of database instructions prompts generation of a log (via logger 160) of corresponding changes (e.g., pending changes) to contents of the relational database 180 associated with the managed object to which the request pertains.

In step 550, the object manager 140 receives an indication from database manager 145 regarding a status of executing the stored procedure 150 with respect to the contents of the relational database 180.

In step 610 of the flowchart 500-2 in FIG. 6, the object manager 140 receives an identifier from the database manager 145. The identifier can be a pointer associated with the respective log of logger 160 and is received in response to the logger 160 storing information associated with the corresponding changes to the contents of the relational database 180 associated with the managed object. In one embodiment, the pointer identifies a location of the respective log that stores information associated with changes to the database 180.

In step 620, the object manager 140 instantiates a result set object 122 in object cache 121 to include the transaction identifier and the pointer (e.g., identifier) associated with the respective log generated by the logger 160.

In step 630, the command processor framework 136 in object manager 140 communicates a message to the synchronizer 138 in object manager 140 to indicate that changes have been made to the relational database 180 with respect to the managed object. In other words, the command processor framework 136 notifies the synchronizer 138 that changes have been committed to the database 180. The message to the synchronizer 138 prompts the synchronizer 138 to update the set of managed objects in the object cache 121 based on the changes to the relational database associated with the managed object and as identified in the respective log generated by logger 160.

In step 640, the command processor framework 136 provides notification to synchronizer 138 of the identifier in the result set object 122. The synchronizer 138 utilizes the identifier or pointer in the result set object 122 to: i) access the respective log generated by logger 160, ii) identify the corresponding changes as a result of applying the stored procedure 150, and iii) notify at least one process 110 utilizing the respective managed object (to which stored procedure 150 was applied) regarding the changes to the contents of the relational database 180 associated with the managed object.

Figure 7:
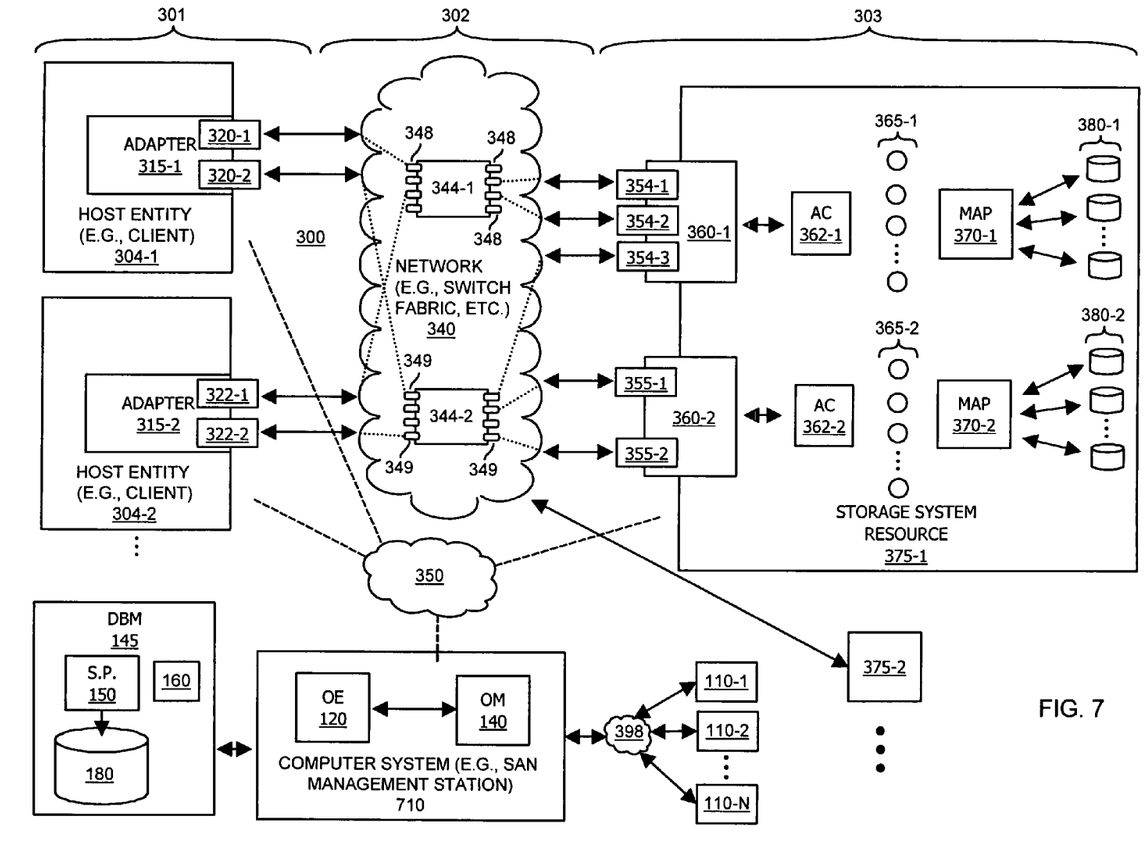
FIG. 7 is a block diagram illustrating resources in a storage area network environment represented by managed objects according to an embodiment herein.

FIG. 7 is a block diagram more particularly illustrating connectivity of example network resources (e.g., host resources 301, switch resources 302, and storage resources 303) in a storage area network environment 300. As shown, storage area network environment 300 includes host entity 304-1, host entity 304-2, ... (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and database 180. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340.

Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

Object manager 140 in computer system 710 provides management functions with respect to storage area network environment 300. For example, object manager 140 maintains objects in object cache 121 based on corresponding data stored in database 180. As previously discussed, processes 110 can initiate execution of stored procedure 150 with respect to contents of database 180 for a specified managed object. Logger 160 tracks changes to database 180 based on execution of one or more stored procedures 150. Database 180 stores managed objects including information reflecting a configuration of storage area network environment 300.

A user at computer system 710 can locally retrieve the managed objects from database 180 for viewing on display screen via a graphical user interface associated with computer system 110 to view a respective configuration of the storage area network 300. As mentioned, processes 110 (and corresponding users) can also retrieve and view information associated with objects/object hierarchies in object cache 121.

Note that in addition to the examples of object hierarchies discussed herein, examples of other samples managed object hierarchies associated with the storage area network can be found in related U.S. patent application Ser. No. 11/001,489 entitled "METHODS AND APPARATUS FOR DEALLOCATION OF RESOURCES," filed on Dec. 1, 2004, the entire teachings of which are incorporated herein by this reference. These hierarchies and corresponding information can be viewed on a respective display screen.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340.

Computer system 710 enables a storage area network administrator at a remote process 110 to communicate over network 398 and modify a configuration of the storage area network 300. For example, in one embodiment, a storage area network administrator at process 110-1 can modify the configuration of storage area network 300 by sending (e.g., from process 110-1) a request to object manager 140 to initiate a particular command with respect to a top-level managed object representing a respective storage system in the storage area network. In response to receiving the request from respective process 110-1, object manager 140 communicates with database manager 145 to initiate execution of stored procedure 150 with respect to one or more objects having related data stored in database 180. Based on contents of a respective log of database changes maintained by logger 160 resulting from execution of stored procedure 150, object manager 140 notifies users at other processes 110 of the respective one or more objects that have been modified.

As discussed above, techniques herein are well suited for use in environments supporting notification of changes to objects or object hierarchies having respective object data stored in a relational database. One such application for applying these techniques is a storage area network environment. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

We claim:

1. A method to provide notification of modifications with respect to a managed object having corresponding data stored in a relational database, the method comprising:
    initiating execution of a set of database instructions to modify contents of the relational database associated with the managed object, execution of the set of database instructions prompting generation of a log of corresponding changes to contents of the relational database associated with the managed object;
    storing a log identifier associated with the log, the log identifier being a pointer referencing a location of the log in a corresponding repository;
    providing notification of the log identifier to a synchronizer that utilizes the log identifier to: i) access the log, ii) identify the corresponding changes, and iii) notify at least one process that utilizes the managed object regarding the changes to the contents of the relational database associated with the managed object; and
    prior to storing the log identifier, receiving the log identifier from a database related process in response to the log storing information associated with the corresponding changes to the contents of the relational database associated with the managed object.

2. A method as in claim 1, wherein storing the log identifier includes instantiating a result set object in which to store the log identifier, the synchronizer obtaining the log identifier from the result set object in order to access the log, the log indicating a pending set of changes to eventually be made to the contents of the relational database as a result of executing the set of database instructions.

3. A method as in claim 2 further comprising:
    generating a communication to the synchronizer indicating that the pending set of changes have been committed to change the contents of the relational database associated with the managed object, the communication prompting the synchronizer to identify and notify the at least one process of an occurrence of the changes to the managed object.

4. A method as in claim 1 further comprising:
    receiving a request from a given process to modify the managed object;
    generating a transaction identifier associated with the request, the transaction identifier indicative of a respective transaction including execution of the database instructions to modify the managed object to which the transaction applies; and
    instantiating a result set object to include the transaction identifier and the log identifier.

5. A method as in claim 4 further comprising:
    instantiating a set of managed objects in memory prior to receiving the request to modify the managed object, the set of managed objects having related object data stored in the relational database, each of multiple processes including the given process having access to the instantiated set of managed objects in memory; and
    communicating a message to the synchronizer to indicate that changes have been made to the relational database with respect to the managed object, the message prompting the synchronizer to update the set of managed objects in memory based on the changes to the relational database associated with the managed object.

6. A method as in claim 1, wherein the set of database instructions is a pre-generated set of operational instructions that are generated based on an analysis of a relationship between an object type associated with the managed object and a corresponding structure for storing associated object data associated with the managed object in the relational database, the analysis being performed before receiving a respective command to initiate the set of database instructions and execution of the set of database instructions; and
    wherein initiating execution of the set of database instructions includes initiating execution of the pre-generated set of operational instructions with respect to the contents of the relational database associated with the managed object.

7. A computer system that facilitates notification of changes associated with a managed object having corresponding data stored in a relational database, the computer system comprising:
    a processor;
    a memory unit that stores instructions associated with an application executed by the processor; and
    an interconnect coupling the processor and the memory unit, enabling the computer system to execute the application and perform operations of:
        initiating execution of a set of database instructions to modify contents of the relational database associated with the managed object based on input from a first process of multiple processes, execution of the set of database instructions corresponding changes to contents of the relational database associated with the managed object, each of the multiple processes accessing the managed object from a cache, the managed object populated with data retrieved from the relational database;
        storing a log identifier associated with the log, the log identifier referencing a location of the log in a repository;
        providing notification of the log identifier to a synchronizer that utilizes the log identifier to: i) access the log, ii) identify the corresponding changes, and iii) notify a second process that utilizes the managed object of the changes to the contents of the relational database associated with the managed object maintained in the cache; and
        prior to storing the log identifier, receiving the log identifier from a database related process in response to the log storing information associated with the corresponding changes to the contents of the relational database associated with the managed object; and wherein the synchronizer is configured to; i) keep track of which of the multiple processes accesses the managed object in the cache, ii) update the managed object in the cache in accordance with the changes to contents of the relational database based on use of the log as identified by the log identifier, iii) update the managed object in the cache by initiating population of the managed object with at least a portion of the changed contents of the relational database, and iv) notify processes that access the managed object of updates to the managed object in the cache.

8. A computer system as in claim 7, wherein storing the log identifier includes storing the log identifier in a respective object used by the synchronizer to access the log and update the managed object in the cache based on the changes to the contents of the relational database, the log indicating a set of changes associated with the contents of the relational database as a result of executing the set of database instructions; and wherein the input from the first process is a request to execute the set of database instructions to change the contents in the relational database.

9. A computer system as in claim 8 further supporting operations of:

generating a communication to the synchronizer indicating that the pending set of changes have been committed to change the contents of the relational database associated with the managed object, the communication prompting the synchronizer to identify and notify the second process of an occurrence of the changes to the contents in the relational database associated with the managed object.

10. A computer system as in claim 7 further supporting operations of:

instantiating a set of managed objects in the cache prior to receiving the request to modify the managed object, the set of managed objects having related object data stored in the relational database, each of multiple processes including the first process and the second process having access to the instantiated set of managed objects in memory; and communicating a message to the synchronizer to indicate that changes have been made to the relational database with respect to the managed object, the message prompting the synchronizer to update the set of managed objects in memory based on the changes to the relational database associated with the managed object.

11. A computer system as in claim 7, wherein the set of database instructions is a pre-generated set of operational instructions that are generated based on an analysis of a relationship between an object type associated with the managed object and a corresponding structure for storing associated object data associated with the managed object in the relational database, the analysis being performed before receiving a respective command to initiate the set of database instructions and execution of the set of database instructions; and wherein initiating execution of the set of database instructions includes initiating execution of the pre-generated set of operational instructions with respect to the contents of the relational database associated with the managed object.

12. A computer program product including a computer-storage medium having instructions stored thereon for processing data information, such that the instructions, when carried out by a processing device, enable the processing device to perform the steps of:

initiating execution of a set of database instructions to modify contents of the relational database associated with the managed object, execution of the set of database instructions prompting generation of a log of corresponding changes to contents of the relational database associated with the managed object;

storing a log identifier associated with the log, the log identifier being a pointer referencing a location of the log in a corresponding repository;

providing notification of the log identifier to a synchronizer that utilizes the log identifier to: i) access the log, ii) identify the corresponding changes, and iii) notify at least one process that utilizes the managed object regarding the changes to the contents of the relational database associated with the managed object; and prior to storing the log identifier, receiving the log identifier from a database related process in response to the log storing information associated with the corresponding changes to the contents of the relational database associated with the managed object.

* * * * *